(12) United States Patent
Han et al.

(10) Patent No.: US 11,349,346 B2
(45) Date of Patent: May 31, 2022

(54) WIRELESS POWER TRANSMISSION APPARATUS

(71) Applicant: AMOSENSE CO., LTD., Cheonan-si (KR)

(72) Inventors: Bo Hyeon Han, Goyang-si (KR); Hee Jung Seo, Incheon (KR); Won San Na, Seoul (KR)

(73) Assignee: Amosense Co., Ltd., Cheonan-si (KR)

( * ) Notice: Subject to any disclaimer, the term of this patent is extended or adjusted under 35 U.S.C. 154(b) by 187 days.

(21) Appl. No.: 16/956,662

(22) PCT Filed: Mar. 5, 2019

(86) PCT No.: PCT/KR2019/002493
§ 371 (c)(1),
(2) Date: Jun. 22, 2020

(87) PCT Pub. No.: WO2019/172595
PCT Pub. Date: Sep. 12, 2019

(65) Prior Publication Data
US 2020/0412175 A1    Dec. 31, 2020

(30) Foreign Application Priority Data
Mar. 5, 2018    (KR) .......................... 10-2018-0025976

(51) Int. Cl.
*H02J 50/40*    (2016.01)
*H02J 50/10*    (2016.01)
(Continued)

(52) U.S. Cl.
CPC .......... *H02J 50/40* (2016.02); *H01F 27/2871* (2013.01); *H01F 27/2876* (2013.01);
(Continued)

(58) Field of Classification Search
CPC .. H02J 50/40; H02J 7/0013; H02J 7/02; H02J 50/005; H02J 50/10; H02J 50/70;
(Continued)

(56) References Cited

U.S. PATENT DOCUMENTS

| 2013/0069585 A1* | 3/2013 | Kamata | .................... H02J 50/40 |
| | | | 320/108 |
| 2014/0191714 A1* | 7/2014 | Chiu | ....................... H02J 50/40 |
| | | | 320/108 |

FOREIGN PATENT DOCUMENTS

| JP | 2013-051285 A | 3/2013 |
| JP | 2014-155307 A | 8/2014 |

(Continued)

OTHER PUBLICATIONS

International Search Report issued for International Application No. PCT/KR2019/002493 dated Jun. 24, 2019, 2 pages.

*Primary Examiner* — Paul Dinh
(74) *Attorney, Agent, or Firm* — Rothwell, Figg, Ernst & Manbeck, P.C.

(57) ABSTRACT

A wireless power transmission apparatus having a first coil configured to wirelessly charge a battery of a first electronic device; a second coil formed to have a size relatively greater than that of the first coil and configured to wirelessly charge a battery of a second electronic device; a shielding member configured to shield a magnetic field generated from the first coil and the second coil; and a case configured to accommodate the first coil, the second coil, and the shielding member, wherein the first coil is disposed so that a portion corresponding to a first width of a coil body overlaps a coil body of the second coil, and a portion corresponding to a remaining second width excluding the portion corresponding to the first width is located in a hollow part formed in the coil body of the second coil.

20 Claims, 8 Drawing Sheets

(51) Int. Cl.
  *H02J 50/70* (2016.01)
  *H02J 50/00* (2016.01)
  *H01F 27/28* (2006.01)
  *H01F 27/36* (2006.01)
  *H01F 38/14* (2006.01)
  *H02J 7/00* (2006.01)
  *H02J 7/02* (2016.01)

(52) U.S. Cl.
  CPC .............. *H01F 27/36* (2013.01); *H01F 38/14* (2013.01); *H02J 7/0013* (2013.01); *H02J 7/02* (2013.01); *H02J 50/005* (2020.01); *H02J 50/10* (2016.02); *H02J 50/70* (2016.02)

(58) Field of Classification Search
  CPC .......................... H02J 50/402; H01F 27/2871; H01F 27/2876; H01F 27/36; H01F 38/14; H01F 27/02; H01F 27/2885; H01F 27/366; H01F 27/288
  USPC ........................................................ 320/108
  See application file for complete search history.

(56) References Cited

FOREIGN PATENT DOCUMENTS

| | | |
|---|---|---|
| KR | 10-2016-0057278 A | 5/2016 |
| KR | 10-1693538 B1 | 1/2017 |
| KR | 10-2017-0050991 A | 5/2017 |

* cited by examiner

WIRELESS POWER TRANSMISSION APPARATUS

CROSS REFERENCE TO RELATED APPLICATION

This application is the national phase entry of International Application No. PCT/KR2019/002493, filed on Mar. 5, 2019, designating the United States, which is based upon and claims priority to Korean Patent Applications 10-2018-0025976, filed on Mar. 5, 2018, the entire contents of which are incorporated herein by reference.

TECHNICAL FIELD

The present invention relates to a wireless power transmission technology, and more specifically, to a wireless power transmission apparatus capable of charging all other types of different electronic devices.

BACKGROUND

Wireless power transmission technology which wirelessly transmits electrical energy to an electronic device has already been applied to electrical motors or transformers using the electromagnetic induction principle in the 1800s, and since then, a method of transmitting electrical energy by radiating electromagnetic waves such as radio waves or laser has been attempted.

As described above, the wireless power transmission technology does not require a separate wired cable during charging and thus is very convenient. Accordingly, attempts for applying the wireless power transmission technology to various electronic devices increase.

Meanwhile, in the wireless power transmission technology, power is smoothly transmitted in a state in which a wireless power transmission apparatus and a wireless power receiving module are aligned.

That is, the wireless power transmission technology can obtain excellent charging efficiency in a state in which a transmission antenna included in the wireless power transmission apparatus and a receiving antenna included in the wireless power receiving module are aligned with each other. Specifically, the excellent charging efficiency can be obtained when the transmission antenna and the receiving antenna corresponding to each other are provided to have similar sizes and centers of the transmission antenna and the receiving antenna coincide with each other.

However, the electronic devices to which the wireless power transmission technology is applied have different sizes of the transmission antennas and the receiving antennas according to the type of device. Accordingly, in order to obtain the excellent charging efficiency, a dedicated charger suitable for each electronic device is required.

Accordingly, since a user should have the dedicated charger suitable for each electronic device, there is inconvenience in use.

SUMMARY OF THE INVENTION

The present invention is directed to providing a wireless power transmission apparatus capable of wirelessly charging all batteries of different types of electronic devices through one wireless power transmission apparatus.

Further, the present invention is directed to providing a wireless power transmission apparatus including a Qi standard A11 coil.

One aspect of the present invention provides a wireless power transmission apparatus including: a first coil configured to wirelessly charge a battery of a first electronic device; a second coil formed to have a size relatively greater than that of the first coil and configured to wirelessly charge a battery of a second electronic device; a shielding member configured to shield a magnetic field generated from the first coil and the second coil; and a case configured to accommodate the first coil, the second coil, and the shielding member, wherein the first coil is disposed so that a portion corresponding to a first width of a coil body overlaps a coil body of the second coil, and a portion corresponding to the remaining second width excluding the portion corresponding to the first width is located in a hollow part formed in the coil body of the second coil.

In this case, the first electronic device and the second electronic device applicable to the present invention may be different types of electronic devices having different sizes. As an example, the first electronic device may be a smart watch, and the second electronic device may be a mobile device such as a smart phone.

Further, a portion corresponding to the second width among the coil body of the first coil may be disposed to be spaced an interval apart from one surface of the shielding member.

As another example, some of the thickness of the portion corresponding to the second width among the coil body of the first coil may be accommodated in the hollow part formed in the coil body of the second coil. In this case, the coil body of the first coil may be a multilayer flat coil including a first flat coil having a width equal to the sum of the first width and the second width and a second flat coil having the same width as the second width, and the second flat coil may be accommodated in the hollow part formed in the coil body of the second coil.

Further, the wireless power transmission apparatus according to one embodiment of the present invention may include a support member configured to accommodate the shielding member to prevent damage to the shielding member, and improve a fastening property with the case.

Meanwhile, another aspect of the present invention provides a wireless power transmission apparatus including: a first coil configured to wirelessly charge a battery of a first electronic device; a second coil which is an A11 standard coil having a size relatively greater than that of the first coil and wirelessly charges a battery of a second electronic device; a shielding member configured to shield a magnetic field generated from the first coil and the second coil; and a case configured to accommodate the first coil, the second coil, and the shielding member, wherein a coil body of the first coil is a multilayer flat coil in which a first flat coil and a second flat coil are stacked, a portion of the first flat coil is stacked on one surface of a coil body of the second coil and the remaining portion is located in a hollow part formed in the coil body of the second coil, and the second flat coil is accommodated in the hollow part formed in the coil body of the second coil.

According to the present invention, all batteries of different types of electronic devices can be wirelessly charged through one wireless power transmission apparatus. Accordingly, since the wireless power transmission apparatus can be used for all various types of electronic devices without using dedicated chargers, convenience in use can be improved.

Further, in the present invention, since any one of a plurality of coils can maintain a specification of a Qi standard A11 coil, a certification problem for the Qi standard coil can be solved and different types of electronic devices can be charged.

DETAILED DESCRIPTION OF THE INVENTION

Figure 1:
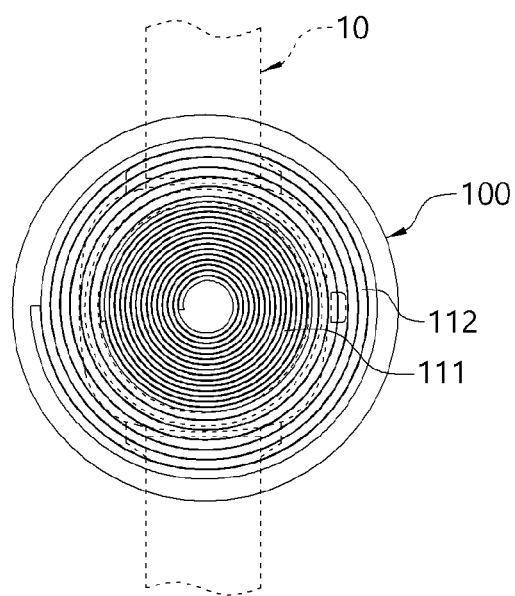
FIG. 1 is a view illustrating a use state in which a wireless power transmission apparatus according to one embodiment of the present invention charges a first electronic device.

Hereinafter, exemplary embodiments of the present invention will be described in detail with reference to the accompanying drawings which may allow one of ordinary skill in the art to easily carry out the present invention. The present invention may be implemented in various forms and is not limited to the following embodiments. Components not related to the description are not included in the drawings to clearly describe the present invention, and the same reference symbols are used for the same or similar components in the description.

Figure 2:
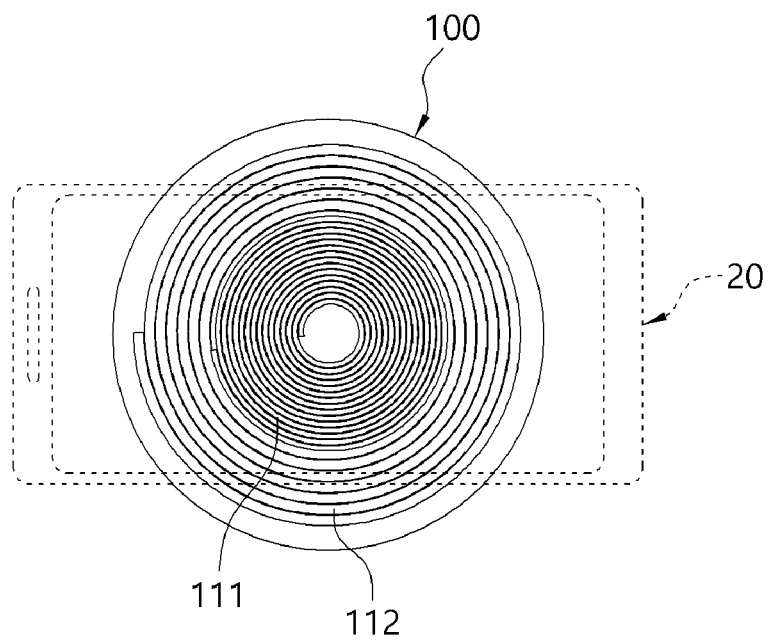
FIG. 2 is a view illustrating a use state in which the wireless power transmission apparatus according to one embodiment of the present invention charges a second electronic device.

As shown in FIGS. 1 and 2, when an electronic device 10 or 20 which is an object to be charged and has a built-in wireless power receiving module is disposed at an upper side, a wireless power transmission apparatus according to one embodiment of the present invention may charge a battery included in the electronic device 10 or 20 by transmitting wireless power to the wireless power receiving module.

In this case, a wireless power transmission apparatus 100 according to one embodiment of the present invention may charge all different types of electronic devices having different sizes. In this case, one of the different types of electronic devices may be an electronic device in which a battery is wirelessly charged using a Qi standard A11 coil.

As an example, the different types of electronic devices 10 and 20 may be a first electronic device 10 in which a battery is wirelessly charged using a coil having a relatively smaller size than the Qi standard A11 coil and a second electronic device 20 in which a battery is wirelessly charged using the Qi standard A11 coil.

That is, the first electronic device 10 may be a wearable device such as a smart watch which may be wirelessly charged using a coil having a relatively smaller size than the Qi standard A11 coil, and the second electronic device may be a mobile electronic device such as a smart phone in which a battery is wirelessly charged using the Qi standard A11 coil.

In the present invention, the different types of electronic devices having different sizes may refer to not only electronic devices such as wearable devices or mobile devices having different sizes and types but also electronic devices of which sizes of receiving antennas of wireless power receiving modules built in the electronic devices are different regardless of overall sizes or types of the electronic devices. Further, the different types of electronic devices may be electronic devices of which the sizes of the receiving antennas of the wireless power receiving modules built in the respective electronic devices are different even in the case of the same electronic devices.

Figure 3:
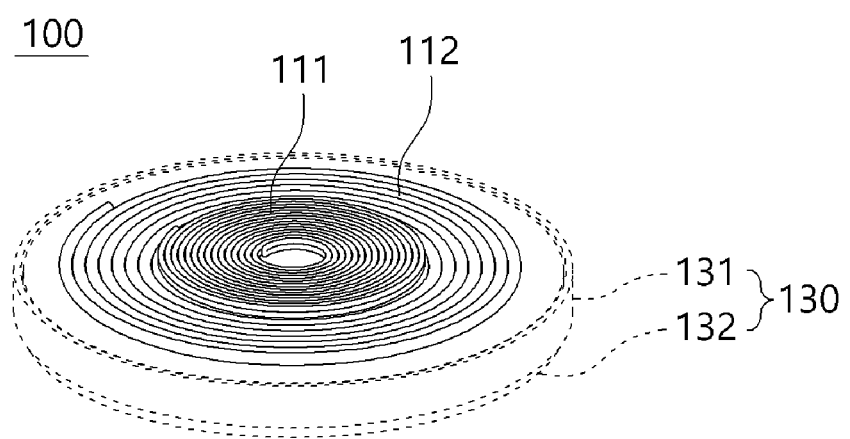
FIG. 3 is a view illustrating the wireless power transmission apparatus according to one embodiment of the present invention.
Figure 4:
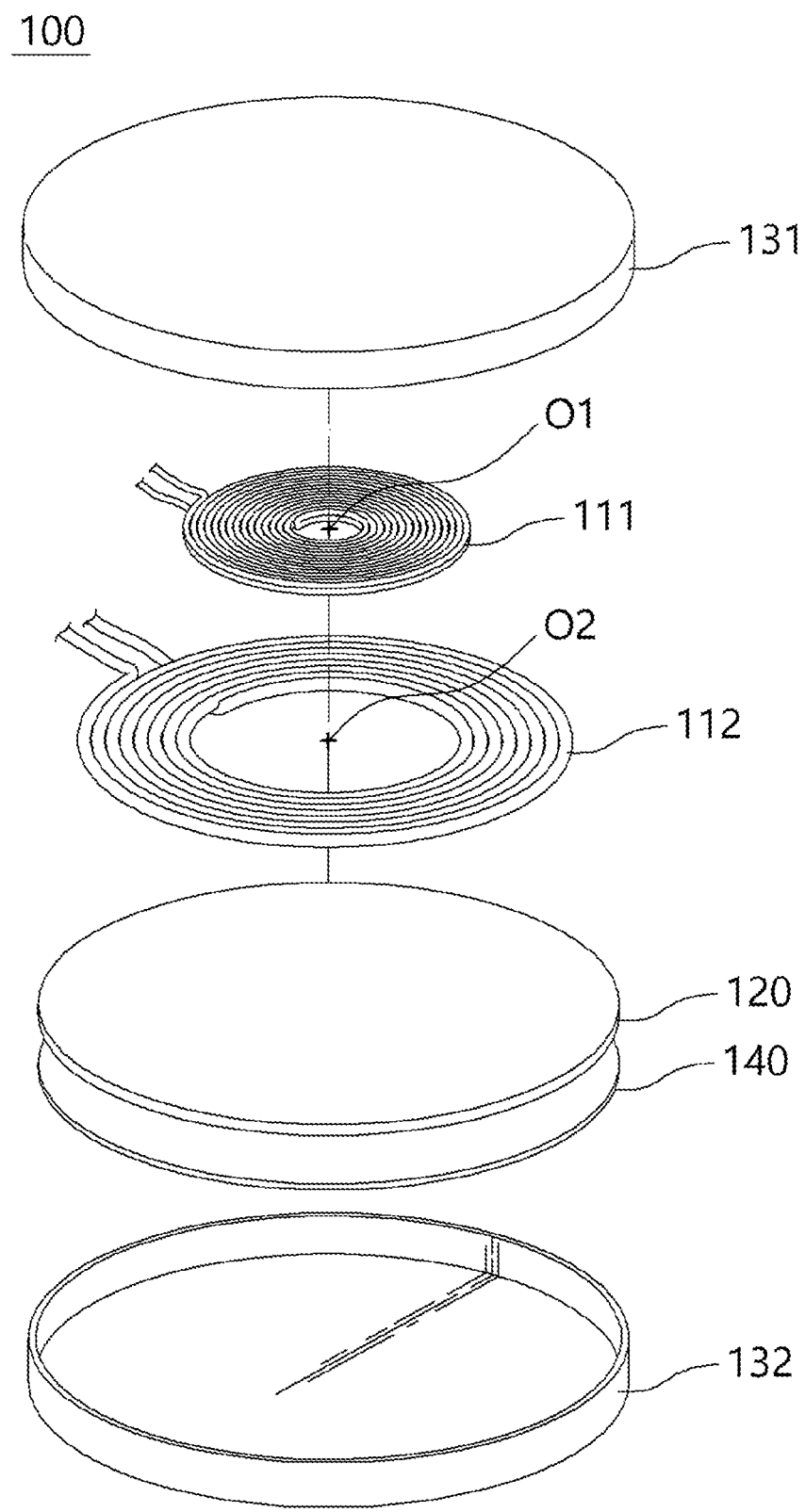
FIG. 4 is an exploded view of FIG. 3.
Figure 5:
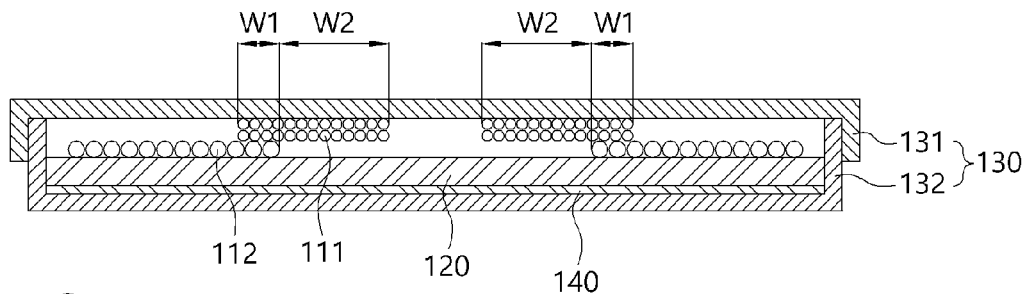
FIG. 5 is a cross-sectional view of FIG. 3.

To this end, as shown in FIGS. 3 to 5, the wireless power transmission apparatus 100 according to one embodiment of the present invention includes a first coil 111, a second coil 112, a shielding member 120, and a case 130.

The first coil 111 and the second coil 112 may transmit wireless power using a predetermined frequency band when power is supplied. That is, the first coil 111 and the second coil 112 may serve as wireless power transmission antennas which transmit the wireless power.

In this case, the first coil 111 may serve as an antenna which charges a battery of the first electronic device 10, and the second coil 112 may serve as an antenna which charges a battery of the second electronic device 20. Further, the first coil 111 may be a coil having a relatively smaller size than the Qi standard A11 coil and the second coil 112 may be the Qi standard A11 coil.

Here, the first coil 111 and the second coil 112 may be composed as flat coils in which conductive members having predetermined lengths are wound in a clockwise direction or counterclockwise direction multiple times and thus hollow parts respectively including central points O1 and O2 are formed at central portions.

That is, each of the first coil 111 and the second coil 112 may include a flat-shaped coil body in which the conductive member is wound, and the hollow part formed in a central portion of the coil body. Further, the first coil 111 and the second coil 112 may be connected in parallel with a circuit board 140 which constitutes a circuit part which controls overall operation.

In the present invention, the coil body of each of the first coil 111 and the second coil 112 may have a circular shape, a quadrangular shape such as a square shape or rectangular shape, or an elliptical shape. Further, the conductive member may be formed of one strand, and may also have a form in which a plurality of strands are twisted in a longitudinal direction.

Meanwhile, as described above, the first coil 111 and the second coil 112 may have different sizes of coil bodies, and the first coil 111 may have a relatively smaller size than the second coil 112.

In this case, as shown in FIGS. 5 to 8, in the first coil 111, a portion corresponding to a first width W1 of the coil body may be disposed to overlap the coil body of the second coil 112, and a portion corresponding to the remaining second width W2 excluding the portion corresponding to the first width W1 may be disposed to be located at the hollow part formed in the coil body of the second coil 112. Further, the first coil 111 and the second coil 112 may be disposed so that the central points O1 and O2 of the coil bodies coincide with each other, and the first coil 111 and the second coil 112 may be selectively operated through the circuit part.

Accordingly, the wireless power transmission apparatus 100 according to one embodiment of the present invention may be disposed so that the second coil 112 among two coils 111 and 112 which charge the batteries of the different types of electronic devices maintains a specification of the Qi standard A11 coil and the first coil 111 having a relatively smaller size than the Qi standard A11 overlaps only a portion corresponding to some width of an entire width of the second coil 112. Accordingly, selective wireless charging of the wireless power transmission apparatus 100 according to one embodiment of the present invention using the first coil 111 and the second coil 112 may be smoothly performed. Accordingly, the wireless power transmission apparatus 100 according to one embodiment of the present invention may solve a certification problem for the Qi standard A11 coil and charge the different types of electronic devices.

Further, in the wireless power transmission apparatus 100 according to one embodiment of the present invention, even when the hollow part of the second coil 112 composed of the Qi standard A11 coil has a relatively smaller size than the first coil 111, since an entire length of the conductive member which constitutes the first coil 111 may be sufficiently elongated, the inductance required during wireless charging of the first electronic device 10 may be easily satisfied.

In addition, in the wireless power transmission apparatus 100 according to one embodiment of the present invention, since the first coil 111 and the second coil 112 are disposed so that the central points O1 and O2 coincide with each other, the wireless charging may be smoothly performed even when the different types of first electronic device 10 and second electronic device 20 are located at the same position. Accordingly, when a user charges the batteries of the electronic devices 10 and 20, since both the electronic devices 10 and 20 may be charged regardless of the types and sizes thereof even when disposed at the same position regardless of the types and sizes thereof, convenience in use may be improved.

As described above, the wireless power transmission apparatus 100 according to one embodiment of the present invention may wirelessly charge both the batteries of the different types of electronic devices 10 and 20 through the wireless power transmission apparatus 100. Accordingly, since the battery of each of the different types of electronic devices 10 and 20 may be charged using the wireless power transmitted through the first coil 111 or second coil 112 without using a dedicated charger, and the electronic devices 10 and 20 may be always disposed at the same position regardless of the types thereof, the convenience in use may be improved.

In this case, as shown in FIGS. 5 to 8, in the wireless power transmission apparatus 100 according to one embodiment of the present invention, the first coil 111 and the second coil 112 may be disposed in various forms.

As an example, as shown in FIG. 5, in the wireless power transmission apparatus 100 according to one embodiment of the present invention, the portion corresponding to the second width W2 among the coil body of the first coil 111 may be disposed to be spaced an interval apart from one surface of the shielding member 120 while not being accommodated in the hollow part formed in the coil body of the second coil 112.

Figure 6:
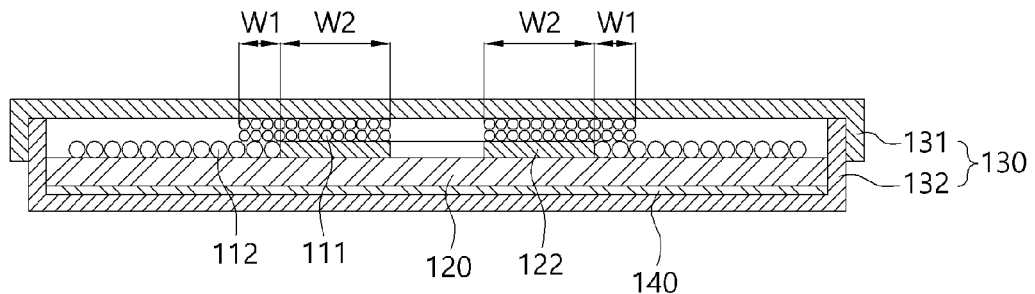
FIG. 6 is a modified example of FIG. 5.

In this case, as shown in FIG. 6, in the wireless power transmission apparatus 100 according to one embodiment of the present invention, a step compensation member 122 which compensates for a height difference with the portion corresponding to the second width W2 of the first coil 111 may be disposed in the hollow part of the second coil 112. Here, the step compensation member 122 may be formed of a nonmagnetic material to solve the certification problem for the Qi standard A11 coil, but is not limited thereto, and may be formed of a magnetic material to improve the shielding performance against a magnetic field generated from the first coil 111.

Figure 7:
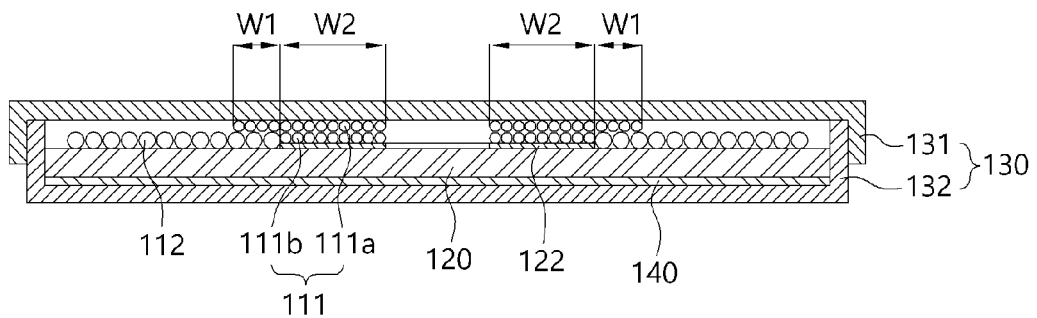
FIG. 7 is another modified example of FIG. 5.
Figure 8:
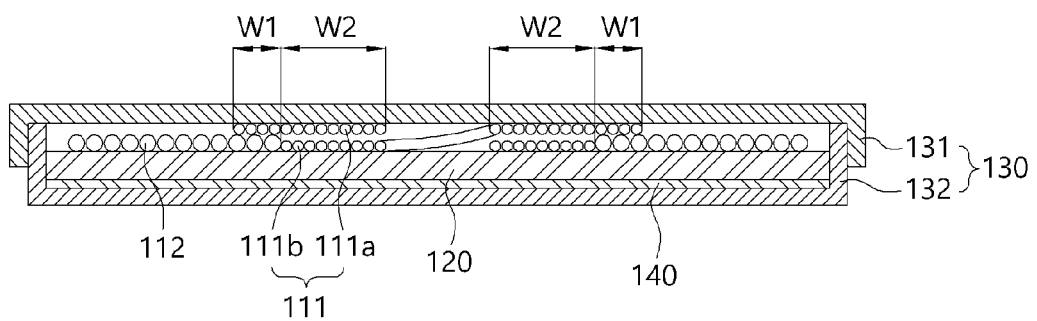
FIG. 8 is a modified example of FIG. 7.

As another example, as shown in FIGS. 7 and 8, in the wireless power transmission apparatus 100 according to one embodiment of the present invention, some of the thickness of the portion corresponding to the second width W2 among the coil body of the first coil 111 may be accommodated in the hollow part of the second coil 112.

Accordingly, in the wireless power transmission apparatus 100 according to the embodiment, since a thickness of the first coil 111 protruding from the second coil 112 may be minimized, an overall thickness may be further reduced. Further, in the wireless power transmission apparatus 100 according to the embodiment, since a separation distance between the second coil 112 and an upper surface of the case 130 may be reduced, charging efficiency of the first coil 111 may be improved.

To this end, the first coil 111 may be a multilayer flat coil including a first flat coil 111a having a width equal to the sum of the first width W1 and the second width W2 and a second flat coil 111b having the same width as the second width W2, and the second flat coil 111b may be accommodated in the hollow part of the second coil 112.

In this case, as shown in FIG. 7, one surface of the second flat coil 111b may be disposed to be spaced apart from one surface of the shielding member 120. In this case, the step compensation member 122 which compensates for a height difference may be disposed between the one surface of the second flat coil 111b and the one surface of the shielding member 120.

Here, like the above-described embodiment, the step compensation member 122 may be formed of a nonmagnetic material to solve the certification problem for the Qi standard A11 coil, but is not limited thereto, and may be formed of a magnetic material to improve the shielding performance against a magnetic field generated from the first coil 111.

Alternatively, as shown in FIG. 8, the second flat coil 111b may be disposed so that one surface thereof may directly come into contact with one surface of the shielding member 120.

Figure 9:
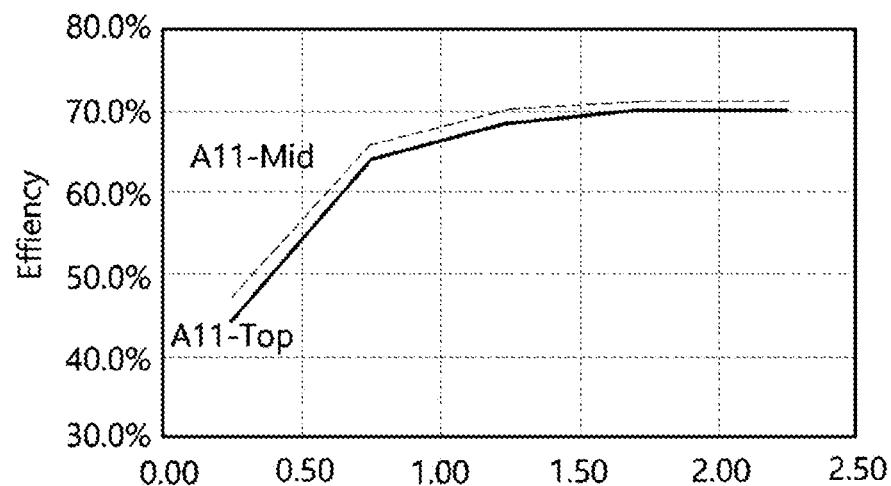
FIG. 9 is a graph illustrating the charging efficiency of the first electronic device using the wireless power transmission apparatus according to one embodiment of the present invention.
Figure 10:
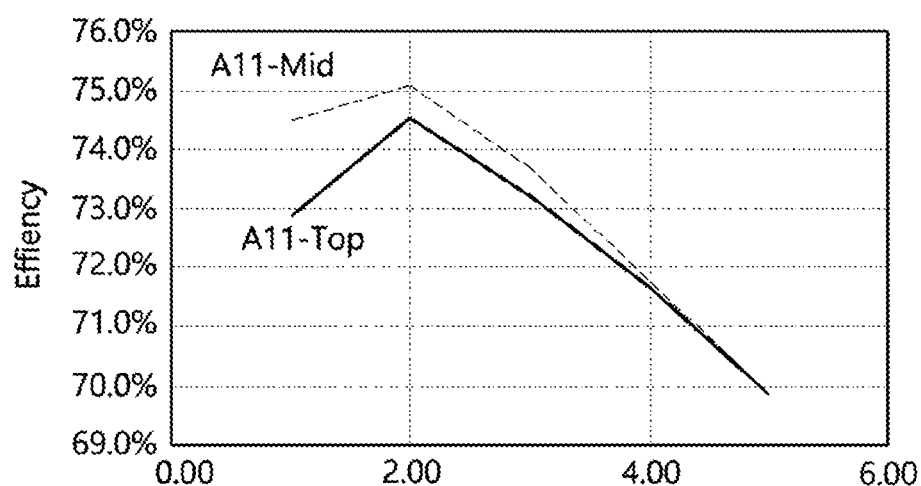
FIG. 10 is a graph illustrating the charging efficiency of the second electronic device using the wireless power transmission apparatus according to one embodiment of the present invention.
Figure 11:
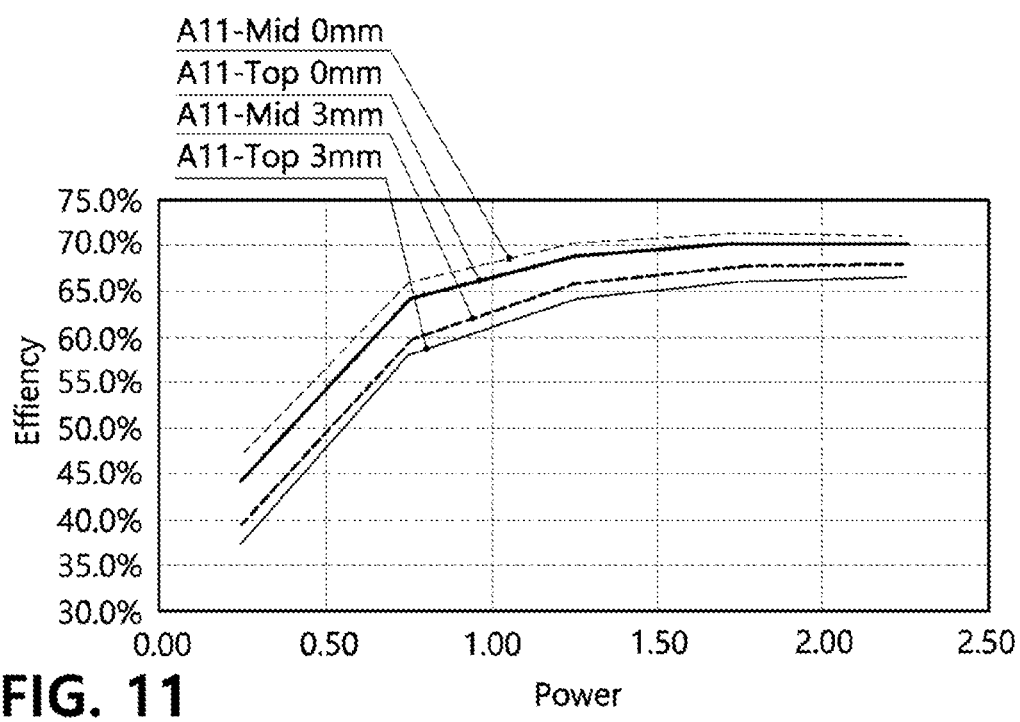
FIG. 11 is a graph illustrating the charging efficiency in an aligned state and a misaligned state of the wireless power transmission apparatus according to one embodiment of the present invention and the first electronic device.

Meanwhile, the charging efficiency of the above-described wireless power transmission apparatus 100 according to one embodiment of the present invention is shown in FIGS. 9 to 11.

In FIGS. 9 to 11, a solid line is the charging efficiency of the embodiment (A11-Top type) shown in FIG. 5, and a dotted line is the charging efficiency of the embodiment (A11-Mid type) shown in FIG. 7. Further, A11-Mid 0 mm and A11-Top 0 mm shown in FIG. 11 are charging efficiencies in an aligned state in which a central point of the wireless power receiving antenna built in the electronic device and the central point of the first coil 111 or second coil 112 coincide with each other, and A11-Mid 3 mm and A11-Top 3 mm are charging efficiencies in a state in which the central point of the first coil 111 or second coil 112 is offset 3 mm from the central point of the wireless power receiving antenna built in the electronic device.

As shown in FIGS. 9 to 11, in the wireless power transmission apparatus 100 according to one embodiment of the present invention, both the first coil 111 and the second coil 112 satisfy the charging efficiency of 70% or more when power of 2 W is supplied, and may satisfy the charging efficiency of 65% or more when power of 2 W is supplied even in not only the aligned state in which the central point of the wireless power receiving antenna built in the electronic device and the central point of the first coil 111 or second coil 112 coincide with each other but also the misaligned state in which the central point of the first coil 111 or second coil 112 is offset 3 mm from the central point of the wireless power receiving antenna built in the electronic device.

The shielding member 120 may improve the performance of each of the first coil 111 and the second coil 112 which operate in a predetermined frequency band by shielding the magnetic field generated from the first coil 111 and the second coil 112 and increasing the focusing of the magnetic field in a required direction.

To this end, the shielding member 120 may be disposed on one surface of the first coil 111 and the second coil 112, and may be formed of a magnetic material.

As an example, an amorphous ribbon sheet, a ferrite sheet, a polymer sheet, or the like may be used as the shielding member 120. Here, the amorphous ribbon sheet may be an amorphous ribbon sheet including at least one or more of an amorphous alloy and a nanocrystalline alloy, an Fe-based or Co-based magnetic alloy may be used as the amorphous alloy, and the ferrite sheet may be sintered ferrite such as Mn—Zn ferrite Or Ni—Zn ferrite.

Further, the shielding member 120 may be flaked and formed separately into a plurality of fine pieces to restrain generation of eddy currents by increasing the overall resistance or to improve flexibility, and the plurality of fine pieces may be formed to be irregular.

In addition, the shielding member 120 may be a multi-layer sheet in which a plurality of magnetic sheets are stacked in multiple layers through an adhesive layer, or may be a hybrid sheet in which different types of magnetic sheets are stacked. In addition, the plurality of magnetic sheets may be flaked and separated into a plurality of fine pieces, and the fine pieces adjacent to each other may be entirely insulated or partially insulated.

It is noted that any of the known materials which are commonly used to increase wireless power transmission efficiency may be used for the shielding member 120.

The case 130 may accommodate the first coil 111, the second coil 112, and the shielding member 120 therein. Accordingly, the case 130 may prevent exposure of the first coil 111, the second coil 112, and the shielding member 120 to the outside and may protect the first coil 111, the second coil 112, and the shielding member 120 from an external force.

To this end, the case 130 may be formed in a box shape having an inner space.

As an example, the case 130 may include a first case 132 of which an upper portion is opened and a second case 131 coupled to the first case 132 to cover the opened upper portion of the first case 132.

Here, one surface of the second case 131 exposed to the outside may be formed as a horizontal surface, the horizontal surface may be a seating surface on which the first electronic device 10 and the second electronic device 20 which are objects to be charged may be placed.

Further, in the first case 132, the circuit board 140 which constitutes the circuit part which controls overall driving may be disposed to be located on a lower surface of the shielding member 120.

Figure 12:
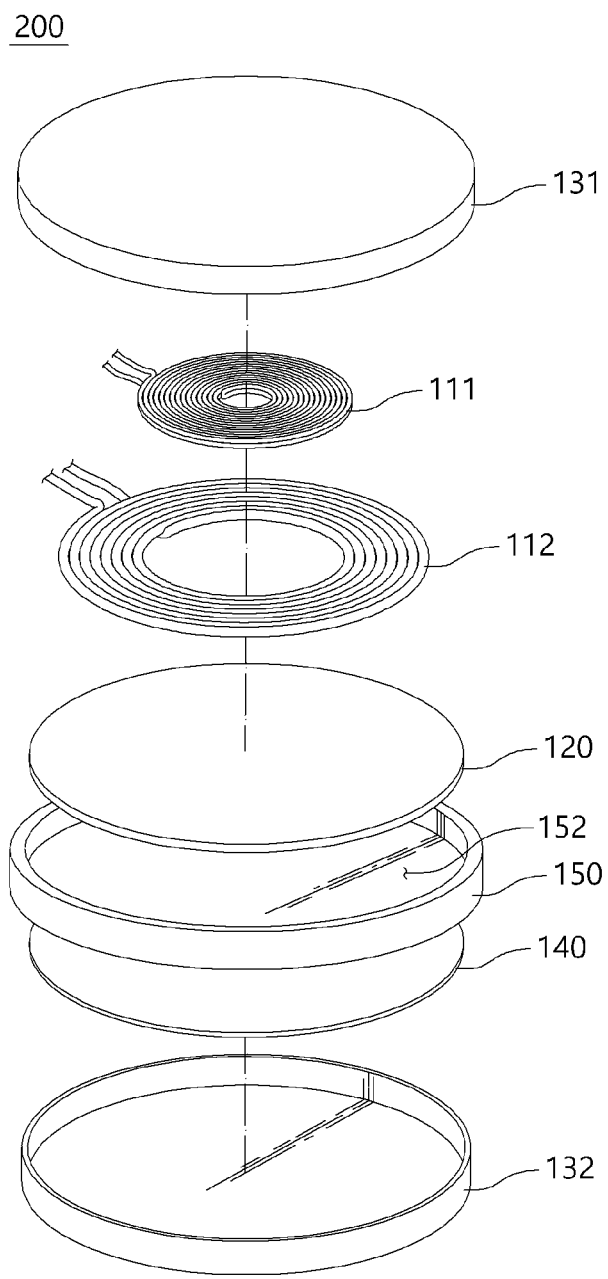
FIG. 12 is an exploded view illustrating a wireless power transmission apparatus according to another embodiment of the present invention.
Figure 13:
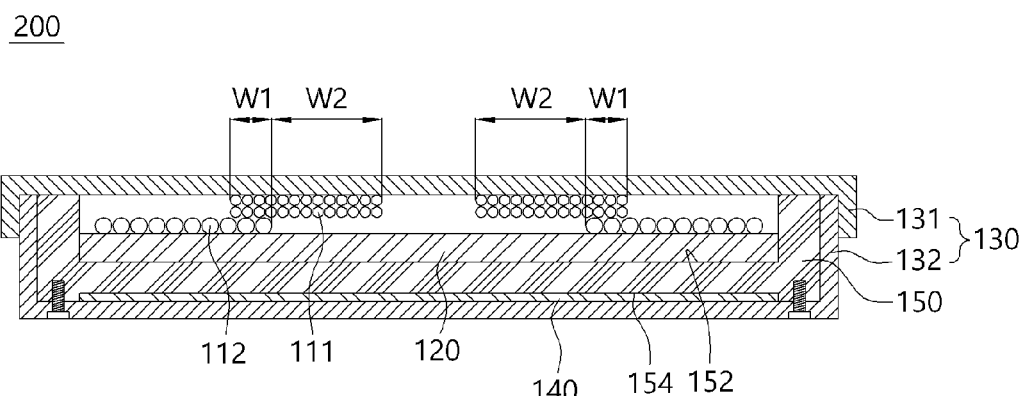
FIG. 13 is a coupling-sectional view of FIG. 12.

Meanwhile, as shown in FIGS. 12 and 13, a wireless power transmission apparatus 200 according to one embodiment of the present invention may further include a support member 150 disposed in the case 130.

The support member 150 may support the shielding member 120 and improve a fastening property with the case 130.

As an example, a first accommodation recess 152 which accommodates the shielding member 120 may be formed in one surface of the support member 150, and a lower surface of the support member 150 may be fastened to the case 130 through a fastening member such as a bolt member.

Here, the first accommodation recess 152 may be formed to have an area approximately the same as the shielding member 120, and may have a depth the same as the sum of the thickness of the second coil 112 and the thickness of the portion of the first coil 111 corresponding to the first width W1 stacked on one surface of the second coil 112.

Accordingly, when the shielding member 120 is inserted into the first accommodation recess 152, the shielding member 120 may be supported by the support member 150 and thus may be protected from an external force. Specifically, since the shielding member 120 may be inserted into the first accommodation recess 152 to be protected from the external force even when formed of a ferrite material which may be easily broken, a change in characteristic due to breakage or damage of the shielding member 120 by the external force may be prevented.

Further, since the support member 150 is fixed to the case 130, a process of fixing the shielding member 120 to the case 130 may be omitted. Accordingly, since the process of fixing the shielding member 120 to the case 130 may be omitted, breakage or damage of the shielding member 120 during processing of the shielding member 120 may be fundamentally blocked.

Meanwhile, in a case in which the wireless power transmission apparatus 200 includes the support member 150, the circuit board 140 may be disposed on a lower surface of the support member 150, and a second accommodation recess 154 capable of accommodating the circuit board 140 may be formed in the lower surface of the support member 150.

In this case, the circuit board 140 may be in a state in which a lower surface thereof comes into contact with a bottom surface of the first case 132 in a state of being accommodated in the second accommodation recess 154.

Accordingly, when the support member 150 is fixed to the case 130, the circuit board 140 inserted into the second accommodation recess 154 may maintain a fixed state by the support member 150 without being fixed to the case 130.

In FIGS. 12 and 13 as drawings related to the embodiment, although an example in which the first coil 111, the second coil 112, and the shielding member 120 have the form shown in FIGS. 3 to 5 is described, the present invention is not limited thereto, and the first coil 111, the second coil 112, and the shielding member 120 may have the form shown in FIGS. 6 to 8.

Further, the support member 150 may be formed of a material having a heat dissipation property to prevent concentration of heat at a local position by quickly dispersing the heat generated from the first coil 111, the second coil 112, and the circuit board 140. As an example, the support member 150 may be formed of a plastic material having a heat dissipation property.

Although one embodiment of the present invention is described above, the spirit of the present invention is not limited to the embodiment shown in the description, and although those skilled in the art may provide other embodiments through the addition, change, or removal of the components within the scope of the same spirit of the present invention, such embodiments are also included in the scope of the spirit of the present invention.

The invention claimed is:

1. A wireless power transmission apparatus comprising:
a first coil configured to wirelessly charge a battery of a first electronic device;
a second coil formed to have a size relatively greater than that of the first coil and configured to wirelessly charge a battery of a second electronic device;
a shielding member configured to shield a magnetic field generated from the first coil and the second coil; and
a case configured to accommodate the first coil, the second coil, and the shielding member,
wherein the first coil is disposed so that a portion corresponding to a first width of a coil body overlaps a coil body of the second coil, and a portion corresponding to the remaining second width excluding the portion corresponding to the first width is located in a hollow part formed in the coil body of the second coil.

2. The wireless power transmission apparatus of claim 1, wherein the portion corresponding to the second width among the coil body of the first coil is disposed to be spaced an interval apart from one surface of the shielding member.

3. The wireless power transmission apparatus of claim 2, wherein a step compensation member configured to compensate for a height difference with the portion corresponding to the second width is disposed in the hollow part formed in the coil body of the second coil.

4. The wireless power transmission apparatus of claim 1, wherein some of the thickness of the portion corresponding to the second width among the coil body of the first coil is accommodated in the hollow part formed in the coil body of the second coil.

5. The wireless power transmission apparatus of claim 1, wherein:
the coil body of the first coil is a multilayer flat coil including a first flat coil having a width equal to the sum of the first width and the second width and a second flat coil having the same width as the second width; and
the second flat coil is accommodated in the hollow part formed in the coil body of the second coil.

6. The wireless power transmission apparatus of claim 5, wherein one surface of the second flat coil is disposed to be spaced apart from one surface of the shielding member.

7. The wireless power transmission apparatus of claim 6, wherein a step compensation member configured to compensate for a height difference is disposed between the one surface of the second flat coil and the one surface of the shielding member.

8. The wireless power transmission apparatus of claim 5, wherein one surface of the second flat coil directly comes into contact with one surface of the shielding member.

9. The wireless power transmission apparatus of claim 1, wherein central points of the coil body of the first coil and the coil body of the second coil are disposed to coincide with each other.

10. The wireless power transmission apparatus of claim 3, wherein the step compensation member is a nonmagnetic material.

11. The wireless power transmission apparatus of claim 1, further comprising a support member disposed in the case to support the shielding member.

12. The wireless power transmission apparatus of claim 11, wherein:
a first accommodation recess which is recessed inward is formed in one surface of the support member; and
the shielding member is disposed in the first accommodation recess.

13. The wireless power transmission apparatus of claim 11, wherein the support member is fixedly coupled to the case.

14. The wireless power transmission apparatus of claim 11, further comprising a circuit board electrically connected to the first coil and the second coil,
wherein a second accommodation recess configured to accommodate the circuit board is formed in one surface of the support member facing a bottom surface of the case.

15. The wireless power transmission apparatus of claim 11, wherein the support member is formed of a material having a heat dissipation property.

16. The wireless power transmission apparatus of claim 1, wherein the shielding member is formed of one material among a polymer, ferrite, and an amorphous ribbon.

17. The wireless power transmission apparatus of claim 1, wherein the second coil is a Qi standard A11 coil.

18. The wireless power transmission apparatus of claim 1, wherein the first electronic device is a smart watch, and the second electronic device is a mobile device.

19. A wireless power transmission apparatus comprising:
a first coil configured to wirelessly charge a battery of a first electronic device;
a second coil which is an A11 standard coil having a size relatively greater than that of the first coil and wirelessly charges a battery of a second electronic device;
a shielding member configured to shield a magnetic field generated from the first coil and the second coil; and
a case configured to accommodate the first coil, the second coil, and the shielding member,
wherein a coil body of the first coil is a multilayer flat coil in which a first flat coil and a second flat coil are stacked,
a portion of the first flat coil is stacked on one surface of a coil body of the second coil and the remaining portion is located in a hollow part formed in the coil body of the second coil, and
the second flat coil is accommodated in the hollow part formed in the coil body of the second coil.

20. The wireless power transmission apparatus of claim 7, wherein the step compensation member is a nonmagnetic material.

* * * * *